(12) United States Patent
Popmintchev et al.

(10) Patent No.: US 8,462,824 B2
(45) Date of Patent: Jun. 11, 2013

(54) PHASE-MATCHED GENERATION OF COHERENT SOFT AND HARD X-RAYS USING IR LASERS

(75) Inventors: Tenio V. Popmintchev, Boulder, CO (US); Ming-Chang Chen, Boulder, CO (US); Alon Bahabad, Boulder, CO (US); Margaret M. Murnane, Boulder, CO (US); Henry C. Kapteyn, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 305 days.

(21) Appl. No.: 12/765,859

(22) Filed: Apr. 22, 2010

(65) Prior Publication Data

US 2011/0007772 A1 Jan. 13, 2011

Related U.S. Application Data

(60) Provisional application No. 61/171,783, filed on Apr. 22, 2009, provisional application No. 61/172,686, filed on Apr. 24, 2009, provisional application No. 61/327,065, filed on Apr. 22, 2010.

(51) Int. Cl.
*H01S 3/10* (2006.01)

(52) U.S. Cl.
USPC .................. 372/21; 372/22; 372/55

(58) Field of Classification Search
USPC .................................. 372/21, 22, 55
See application file for complete search history.

(56) References Cited

U.S. PATENT DOCUMENTS

| 2008/0069171 A1* | 3/2008 | Rocca et al. ........... 372/61 |
| 2008/0137696 A1* | 6/2008 | Zhang et al. .......... 372/22 |
| 2008/0144672 A1* | 6/2008 | Cohen et al. .......... 372/5 |
| 2010/0098118 A1* | 4/2010 | Kim et al. ............. 372/22 |

FOREIGN PATENT DOCUMENTS

WO  WO 2009108844 A1 *  9/2009

OTHER PUBLICATIONS

Gibson, E. A. et al., Coherent Soft X-Ray Generation in the Water Window with Quasi-Phase Matching, Science, Oct. 2003, pp. 95-98, vol. 302.*

* cited by examiner

*Primary Examiner* — Yuanda Zhang
(74) *Attorney, Agent, or Firm* — Jennifer L. Bales; Macheledt Bales LLP

(57) ABSTRACT

Phase-matched high-order harmonic generation of soft and hard X-rays is accomplished using infrared driving lasers in a high-pressure non-linear medium. The pressure of the non-linear medium is increased to multi-atmospheres and a mid-IR (or higher) laser device provides the driving pulse. Based on this scaling, also a general method for global optimization of the flux of phase-matched high-order harmonic generation at a desired wavelength is designed.

27 Claims, 14 Drawing Sheets

Pulse Shapes

Laser pulses

HHG pulses

Figure 11 A
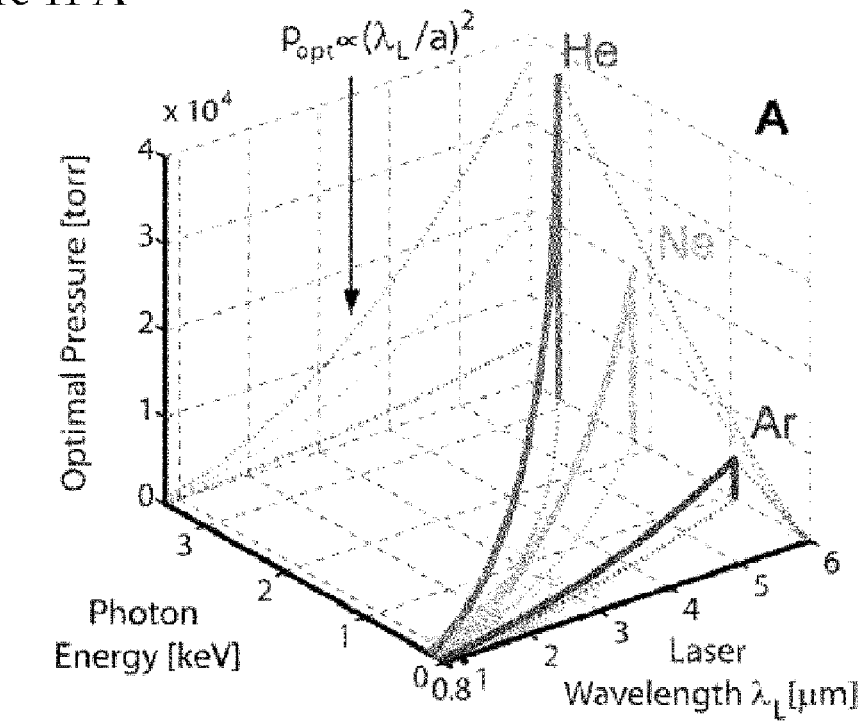
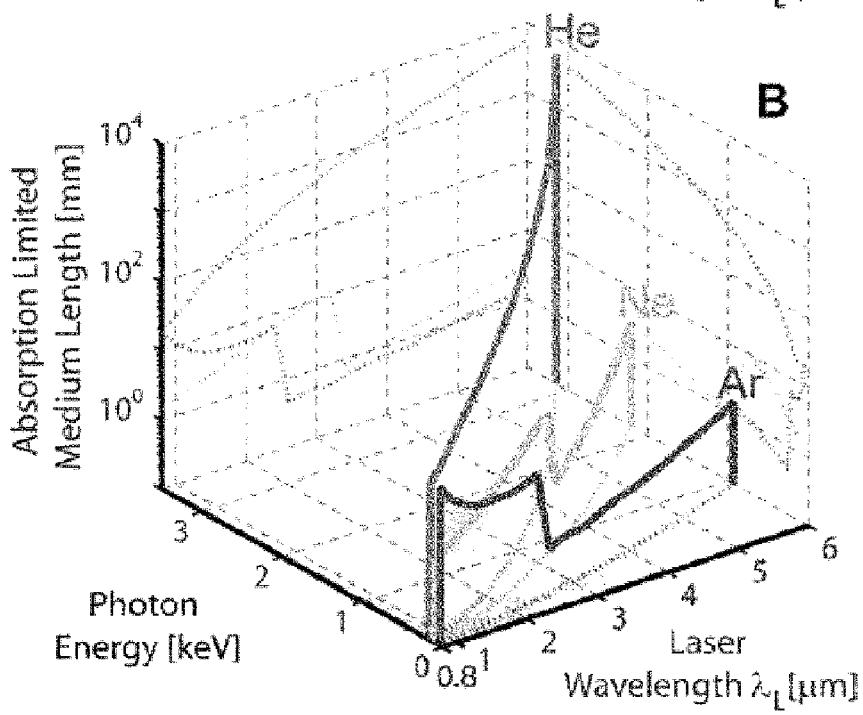
Figure 11 B

> US 8,462,824 B2

PHASE-MATCHED GENERATION OF COHERENT SOFT AND HARD X-RAYS USING IR LASERS

PRIORITY

This application claims benefit of U.S. Provisional Patent Applications No. 61/171,783 filed Apr. 22, 2009, and 61/172,686, filed Apr. 24, 2009, and 61/327,065 filed Apr. 22, 2010.

U.S. Pat. No. 6,151,155 is incorporated herein by reference.

GOVERNMENT SUPPORT

This invention was made with government support under grant number DE-FG02-04ER15592 awarded by the Department of Energy and grant number EEC 0310717 awarded by the National Science Foundation. The government has certain rights in the invention.

BACKGROUND OF THE INVENTION

1. Field of the Invention

The present invention relates to phase-matched high-order harmonic generation of soft and hard X-rays using infrared driving lasers in a high-pressure non-linear medium. In particular, the present invention relates to efficient generation of coherent x-ray radiation by coherent upconversion of light from an intense mid-infrared pulsed laser in a high pressure gas nonlinear medium. The invention further relates to a general method for global optimization of the flux of coherent light of desired wavelength by selecting the optimal wavelength of the driving laser and its parameters, in combination with the optimal nonlinear medium and its parameters.

2. Background of the Invention

High-order harmonic generation (HHG) is a unique source of femtosecond-to-attosecond duration soft x-ray beams that has opened up new studies of atoms, molecules, and materials, as well as enabling new high-resolution coherent imaging using a table-top light source. To date, however, most applications of HHG radiation employ extreme ultraviolet wavelengths (photon energy ~20-100 electron volts), because the efficiency of the HHG process decreases rapidly at higher photon energies. This decrease is not fundamental to the HHG process, but rather results from the large phase mismatch between the generated HHG field and the driving laser field at 800 nm, which to date is used in nearly all HHG experiments because of the availability of high-power ultrashort pulse lasers generating light at this wavelength. The obstacle in phase-matching HHG upconversion to very short wavelengths is the higher required laser intensity, which results in high levels of ionization and thus large free electron dispersion. This dominant plasma dispersion limits phase matching of HHG to relatively low levels of ionization, where neutral atom dispersion can balance the anomalous free-electron plasma dispersion. For a 0.8 μm driving laser, the "critical" ionization levels above which true phase matching is not possible are ≈5% for argon and ≈0.5% for helium. As a result, the highest photon energies that can be phase matched in Ar and He are ~50 eV and ~130 eV respectively.

Another important limit in HHG is the highest photon energy that can be generated by the laser regardless of phase matching—the so-called cutoff energy. This cutoff is given by $h\nu_{max}=I_p+3.2U_p$, where $I_p$ is the ionization potential of the gas and $U_p \propto I_L \lambda_L^2$ is the quiver energy of the liberated electron, $\lambda_L$ is the wavelength of the laser driving the process, and $I_L$ is its intensity. The favorable $\lambda_L^2$ scaling has motivated studies of HHG with mid-infrared driving pulses with wavelength longer than 800 nm. Significant extension of the cutoff energy $h\nu_{max}$ to higher energy was demonstrated in several experiments. However, it was recently found theoretically that the actual EUV or x-ray yield of an atom radiating HHG light scales as $\lambda_L^{-5.5\pm0.5}$. The use of a longer wavelength driver, although it increases the energy of the individual HHG photons, greatly reduces the total conversion efficiency and thus the total energy in the burst of HHG photons [6]. Thus, increasing the HHG yield by finding new methods of phase-matching the conversion process is critical to obtain a usable flux at shorter wavelengths.

It is an object of the present invention to generate high-order harmonic light in the soft and hard X-ray regions of the spectrum in a more-efficient manner that optimizes phase matching of the light. This can be accomplished by using a mid-infrared driving laser in combination with a very high-pressure non-linear medium. This method of optimizing efficiency of high-harmonic generation conversion to short wavelengths has not heretofore been recognized. Past teaching in the area of high-order harmonic generation mostly employed sub-atmosphere target pressures, with the use of a very short-wavelength driving laser to maximize high-harmonic flux.

SUMMARY OF THE INVENTION

An object of the present invention is to generate phase-matched high-order harmonic generation of soft and hard X-rays using infrared driving lasers in a high-pressure non-linear medium.

For example, driving lasers having a wavelength of 1.3 μm and 2.0 μm generate HHG light in the water window region of the spectrum where the HHG is macroscopically phase-matched over centimeter distances. The optimal phase matching pressures of the non-linear medium are multi-atmosphere and are preferably combined with very moderate ionization levels of the medium ($\approx 10^1$-$10^{-3}$%). In this regime, the driving laser beam experiences minimal nonlinear distortion, resulting in an excellent spatial coherence of the HHG beam even when conversion is happening in a high pressure gas, well above one atmosphere.

To phase-match a nonlinear conversion process, the driving pulse phase velocity is matched to the phase velocity of the generated x-rays. The phase mismatch comprises the pressure-dependent neutral atom and free electron dispersions and pressure-independent geometric dispersions. These factors can cancel each other out within certain ranges. Therefore, the pressure and the ionization (and other factors) may be adjusted to minimize the phase mismatch.

Apparatus according to the present invention provides significant conversion efficiency of laser light into the x-ray spectrum. Soft x-rays allow coherent diffractive imaging/sensing (lensless imaging or holography) of biological specimens with resolution <<100 nm, using a table-top microscope. Hard x-ray applications include x-ray crystallography, diffraction imaging, and x-ray medical and biomedical imaging and treatment.

BRIEF DESCRIPTION OF THE DRAWINGS

FIG. 11A is a plot of pressure energy and wavelength. FIG. 11B is a plot of medium length, energy and wavelength.

DETAILED DESCRIPTION OF THE PREFERRED EMBODIMENT

Figure 1A:
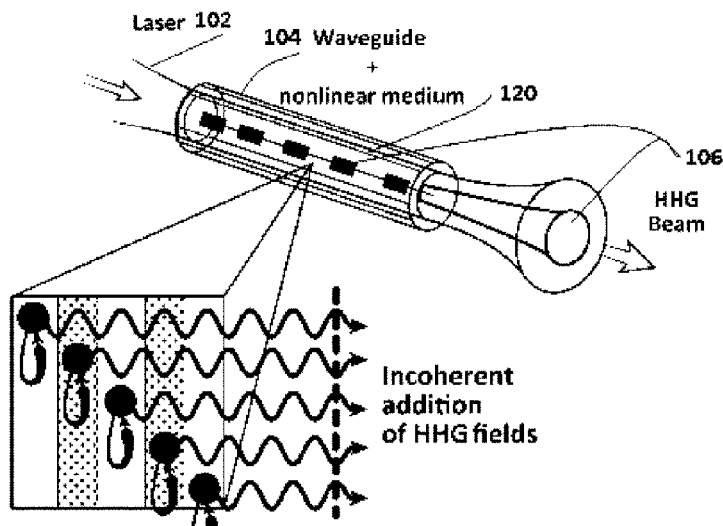
FIGS. 1A-1D (Prior Art) are schematic diagrams illustrating high-harmonic emission generation (HHG) without phase matching.
Figure 1B:
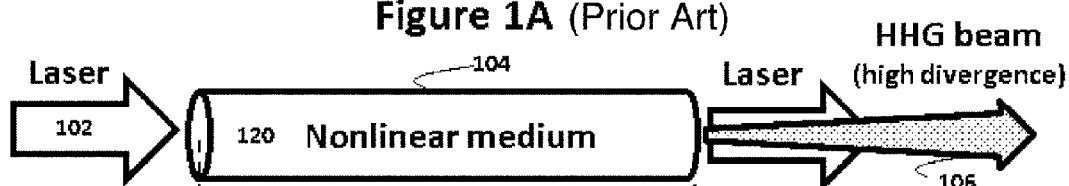
Figure 1C:
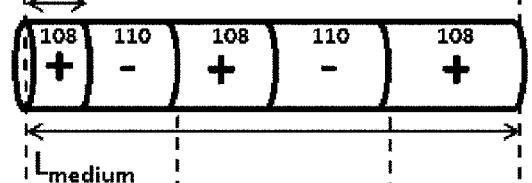

FIGS. 1A-1D (Prior Art) are schematic diagrams illustrating high-harmonic emission generation (HHG) without phase matching. FIG. 1A shows the interactions within waveguide 104 in medium 120, wherein harmonics are generated, but are added incoherently. In FIG. 1B, driving pulse 102 comprises, for example, a femtosecond laser pulse, which enters the HHG medium 120. The diagram in FIG. 1C indicates the regions within the HHG medium in which constructive and destructive interference of HHG emissions will occur, due to the short coherence length of the HHG beam. The areas indicated by a plus (+) are areas of constructive interference, while the areas indicated by a minus (−) are areas of destructive interference. The length of one positively interfering area (+) in the absence of a modulating pulse is one coherence length. Note that the lengths of the (+) and (−) varies over the interaction length, which will make the task of phase matching more complicates. In general, the non-phase-matched HHG beams are of higher relative divergence.

Briefly, an ultrashort light pulse 102 is focused into a medium 120 (for example a noble gas) to generate high-order harmonics 106 in the x-ray regions of the spectrum (generally termed "x-ray HHG" herein). However, particularly for conversion to very short wavelengths, the high-harmonic process is not well phase-matched, for a variety of reasons. The most significant is usually the presence of a plasma, generated either through pre-ionization of the medium or through the intense laser-matter interaction itself, that affects the speed of propagation of the driving laser pulse 102. The "polarization" of the medium (i.e. where the high harmonics are generated) follows the propagation of the driving laser pulse, while the generated signal 106 travels at the (different) speed of light of the signal in the medium.

Figure 1D:
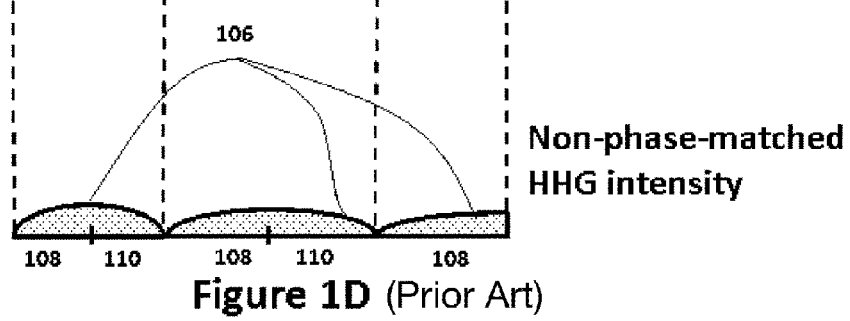

Note that FIG. 1D graphs the intensity of the x-ray HHG signal as it propagates. Thus, the x-axis for this curve corresponds to propagation distance through the medium, while the y-axis corresponds to the intensity of the signal.

Hence, as indicated by output HHG signal 106 in FIG. 1D, at first the HHG signal increases, but as the coherence length is reached destructive interference causes the signal to decrease. This process is repeated with a period of two coherence lengths, with the HHG beam being amplified in portions 108 of the waveform and the HHG beam being attenuated in portions 110 of the waveform. Hence, output HHG beam 106 will contain little HHG signal. The coherence length may vary in space and in time $L_{coh}(z,t)$. The largest HHG signal would be obtained if the waveguide length corresponded to an odd number multiple of coherence lengths, but the HHG signal never gets very large.

Figure 2A:
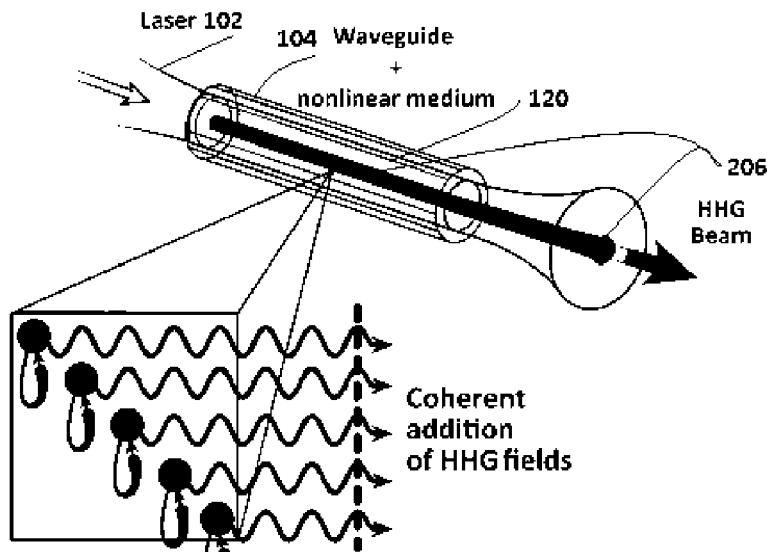
FIGS. 2A-2D are schematic diagrams illustrating how the output x-ray intensity increases with phase matching within the medium, as well as the parameters of the HHG scheme that depend on the driving laser wavelength.
Figure 2B:
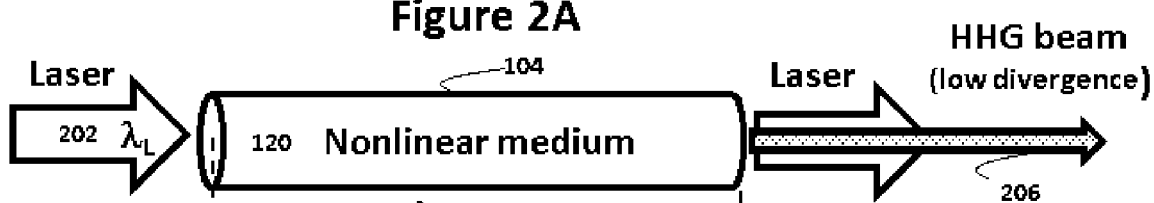
Figure 2C:
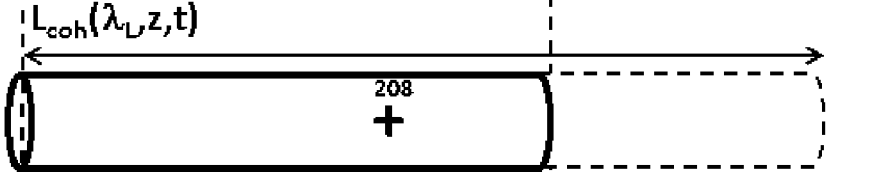
Figure 2D:
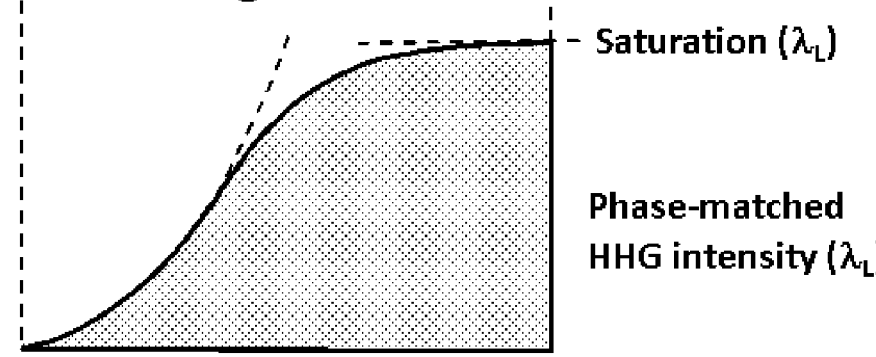

FIG. 2A shows the interactions within waveguide 104 in medium 120, wherein harmonics are generated, and are added coherently. FIG. 2B is a schematic diagram illustrating how the output x-ray intensity increases with phase matching within the medium. Driving pulse 102 phase velocity is matched to the phase velocity of the generated x-rays 206. Thus, the coherence length of the phase matching is extended well beyond the optimal medium length $L_{medium}$ in FIG. 2C (ideally $L_{coh} \to \infty$)—in other words, the entire interaction region is now equivalent to a (+) 208 region similar to the (+) 108 region in FIG. 1C. No significant destructive interference occurs. In the present art, the coherence length $L_{coh}(\lambda_L, z, t)$ for any HHG wavelength can be maintained always relatively long by properly selecting the laser wavelength $\lambda_L$ and the denoted parameters in FIG. 2 that depend on $\lambda_L$. FIG. 2D shows the resulting intensity of the output x-rays over the interaction region. It increases monotonically with interaction length, until non-resonant absorption of the generated HHG or evolution of the laser pulse in the gas limits further buildup of HHG signal. Under phase matching conditions, there is coherent radiation build-up in a very specific direction that reduces the HHG beam divergence, as shown in FIG. 2B compared to FIG. 1B.

Methods of phase matching the generation of high harmonic radiation in a waveguide are known. See for example Rundquist et al., Science 280, 1412 (1998); Durfee et al., Phys. Rev. Lett. 83, 2187 (1999), and U.S. Pat. No. 6,151,155 (incorporated herein by reference). FIGS. 3A-C and 4A-B as well as Table 1 illustrate the differences between the present invention and these known methods. Typically, in the old technique a 0.8 μm wavelength Ti:Sapphire laser drives the high harmonic generation and full phase matching of the process can extend only into the generated soft x-ray wavelengths to about 10 nm (E=hν~130 eV). Therefore, in practice the x-ray flux produced is significant enough to enable applications only down to about 10 nm. In addition, the prior art does not teach determining what the optimal laser wavelength and/or nonlinear medium are for obtaining the highest possible conversion efficiency in the limited photon energy region that is accessible. In this 0.8 μm driving wavelength scheme, the generation of soft x-rays of shorter wavelengths (<10 nm) would require increasing the driving laser intensity. Other factors such as ionization prevent extending phase matching with this process to shorter x-ray wavelengths (see typical values in Table 1, Regime I). Thus, the x-ray emission falls within a region of the nonlinear medium of short length, low density of emitters, and large number of free electrons, dramatically decreasing the x-ray yield to a level not useful for most applications. All experiments in this phase-matched geometry, until the present invention, thus taught that the efficiency of HHG upconversion inevitably decreased as one attempted to generate high-energy photons.

Table I shows a comparison of the practical parameters when attempting to scale the HHG process to achieve shorter X-ray wavelengths, using 0.8 μm driving laser (conventional Regime I), and longer-wavelength driving lasers (current invention Regime II). Note the contrasting parameters.

TABLE 1

|  | Regime I (conventional) | Regime II (invention) |
| --- | --- | --- |
|  | (non-phase-matched)<br>$\lambda_L = 0.8$ μm = const &<br>$I_L$ (Laser Intensity) increases | (phase-matched)<br>$\lambda_L$ increases &<br>$I_L$ decreases (slightly) |
| Peak Laser Intensity ($I_L$) [W/cm$^2$] | Increases from $10^{13}$-$10^{14}$ to >$10^{16}$. | Decreases from $10^{14}$-$10^{15}$ to $10^{14}$ under phase matching conditions. |
| Ionization Level of the Medium | Increases from ~10% to >>200% Highly ionized or multi-ionized nonlinear medium. | Low ionization initially and decreases from ~10% to ~0.001%.<br>Moderately ionized nonlinear medium. |
| Nonlinear Medium Density | Decreases from ~10-500 torr to ~1 torr.<br>Range: fraction of atmosphere. | Increases from ~10-500 torr to ~10000 torr.<br>Range: multi-atmosphere. |
| Useful Nonlinear Medium Length (Coherence length) | Decreases from mm-cm to μm. | Increases from mm-cm to m. |
| Density of the Ionized Electrons | Increases from $10^{17}$ to $10^{18}$ cm$^{-3}$. | Constant: ~$10^{17}$ cm$^{-3}$. |
| X-ray Flux | Non-phase matched addition of X-ray fields: rapidly decreasing at shorter X-ray wavelengths. | Phase-matched addition of X-ray fields: flux does not vary strongly with wavelength. |

Figure 3:
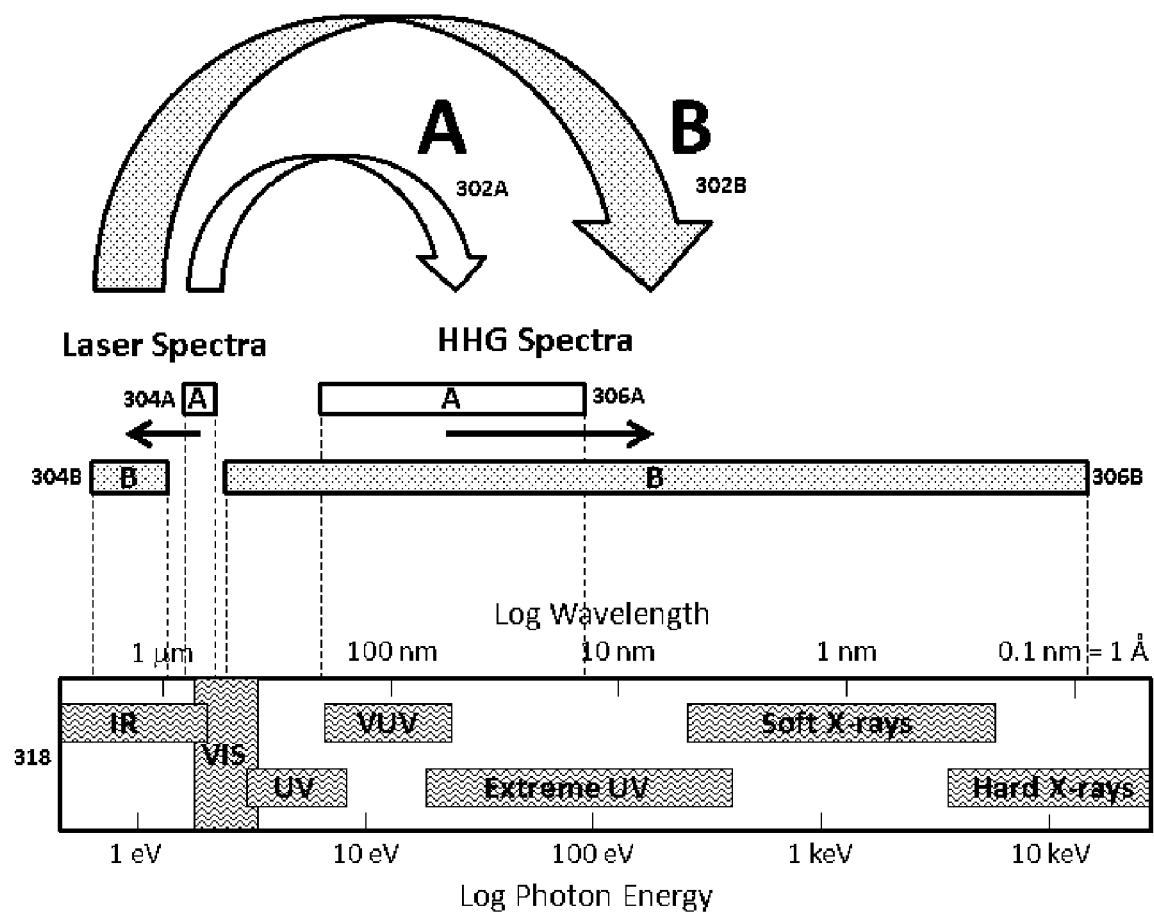
FIG. 3 is a diagram illustrating HHG with phase matching according to prior art A and according to the present invention B in the spectral domain.

FIG. 3 compares the accessible HHG spectrum 306B within spectrum 318 with phase matching according to the present invention compared to results achieved with the phase matching technique of the prior art (Regime I). Arrow 302A shows the phase-matched frequency upconversion achievable in the prior art. The broad driving laser spectrum 304A is of 0.8 μm central wavelength. The phase-matched output HHG spectrum range is indicated by white bar 306A. At best it extends into the UV, VUV and EUV regions.

Arrow 302B indicates the results available employing the method of the current invention (Regime 2). First, the central wavelength of the driving laser spectrum is tuned. The spectral bandwidths of the ultrafast lasers can be relatively broader 304B when moving to the mid-IR spectral region. Correspondingly, the HHG output 306B can be tuned from a few hundred nanometers (few eV in photon energy) up to a few Å in wavelength (multi-keV in photon energy). It is well known for a person skilled in the art, that a single emitter can radiate in these soft (SXR) and hard X-ray (HXR) spectral ranges. In a macroscopic picture, ionization induced effects do not allow prior phase matching techniques to access these regions. In practice, Regime I reaches these spectral ranges with very poor efficiency—the HHG flux is below the threshold required by applications. The present invention enables access to these spectral regions under phase matching conditions. Counter-intuitively to a person skilled in low harmonic generation, the essence of the new method is to increase the laser wavelength (from VIS-IR to mid-IR) in order to extend phase matching of HHG towards shorter wavelengths, from VUV-EUV to SXR and HXR.

Figure 4A:
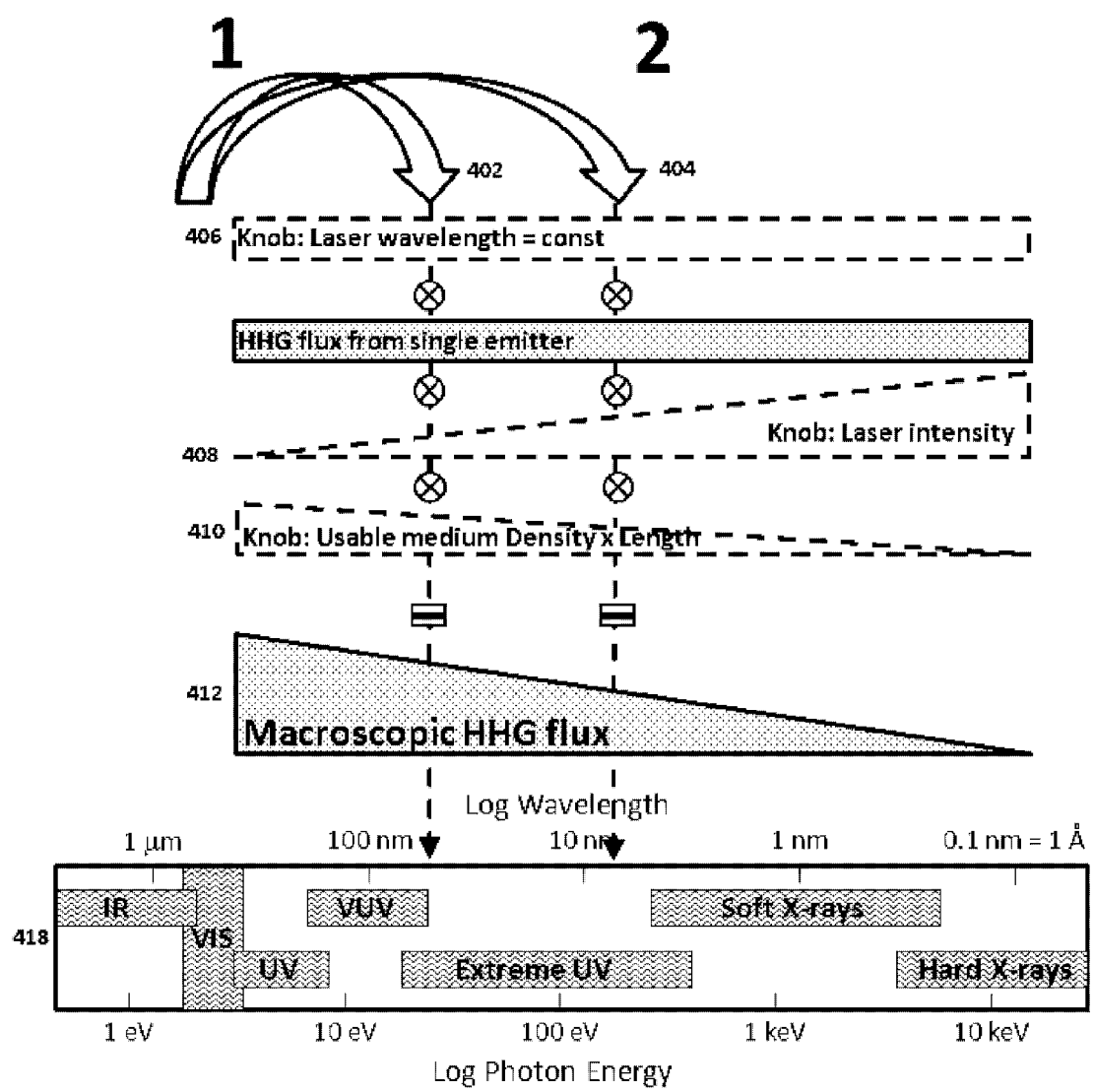
FIGS. 4A (Prior Art) and 4B are schematic diagrams illustrating the resulting macroscopic HHG flux in conventional systems and in the present invention.
Figure 4B:
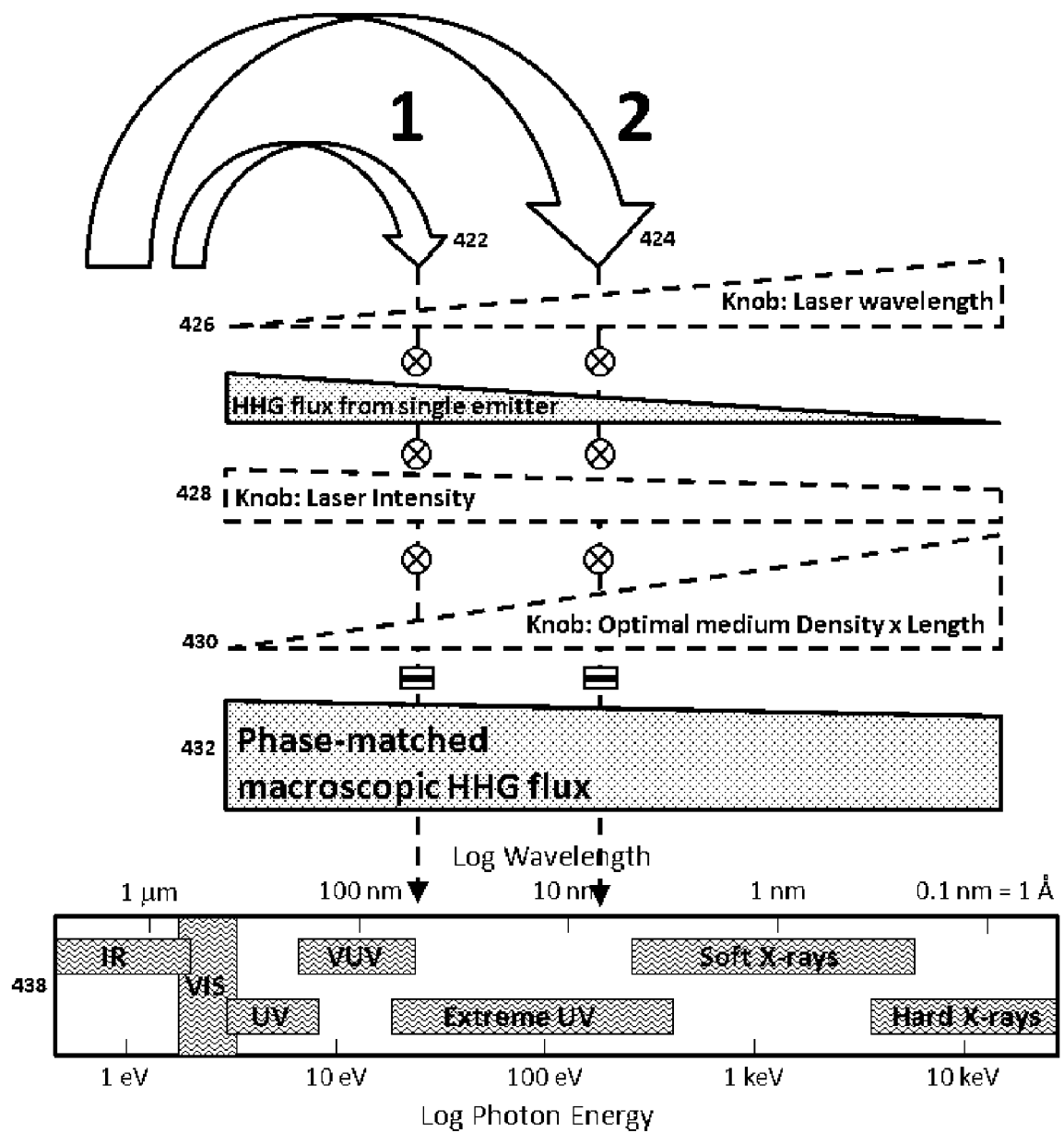

FIGS. 4A (Regime I) and 4B (Regime II) are schematic diagrams illustrating macroscopic HHG flux in conventional systems and in the present invention. Regime I (FIG. 4A) generates photons in the SXR and HXR regions by using the same laser wavelength 406 for which the HHG flux from a single emitter does not vary significantly. Optimization here requires increasing the laser intensity 408 which reduces the usable density-length product 410 (lower number of potential emitters) due to ionization induced effects. The resulting HHG flux 412 drops rapidly at short wavelengths.

The present invention relies on simultaneous increase of the laser wavelength 426 and slight decrease in laser intensity 428, which maintain phase matching conditions. Thus HHG flux from a single emitter scales even faster than the predicted $\lambda_L^{-5.5\pm0.5}$). However, phase matching conditions at shorter HHG wavelengths using longer driving wavelengths favors large optimal or phase matching density-length products (large number of potential emitters). As a result, the macroscopic phase-matched HHG flux 432 varies slightly with wavelength.

Figure 5:
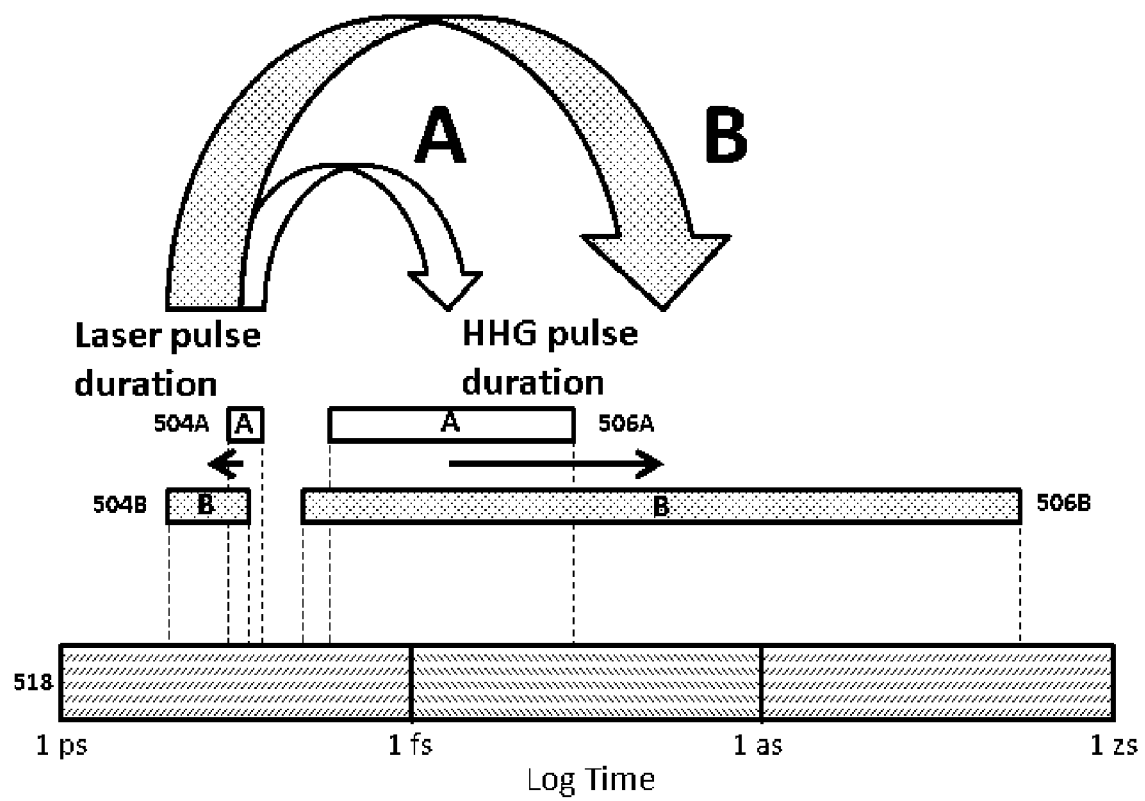
FIG. 5 is a diagram illustrating the driving lasers pulses and the HHG pulses with phase matching in conventional systems and in the present invention in the time domain.

FIG. 5 is a diagram illustrating HHG with phase matching according to the present invention (Regime 2), compared to results achieved with phase matching using prior art techniques in the time domain. Again, Arrow 502A indicates the results achievable in the prior art—bright femtosecond-to-attosecond HHG pulses. A smaller range of HHG output pulse durations 506A is achievable due to the narrower phase-matched HHG bandwidth 306A available. Arrow 502B indicates the results achievable with the present invention (Regime 2)—femtosecond-to-attosecond-to-zeptosecond HHG pulses. With devices according to the present invention, the available HHG pulse duration range 506B is larger due to the larger phase-matched HHG bandwidth 306B. Time scale 518 shows log time.

Figure 6A:
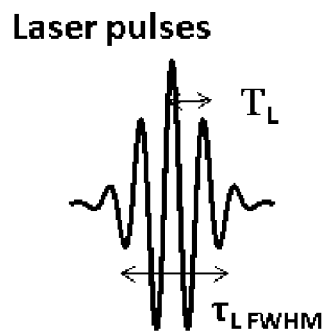
FIGS. 6A-6D are schematic diagrams illustrating input pulse shapes and output pulse shapes according to the present invention.
Figure 6B:
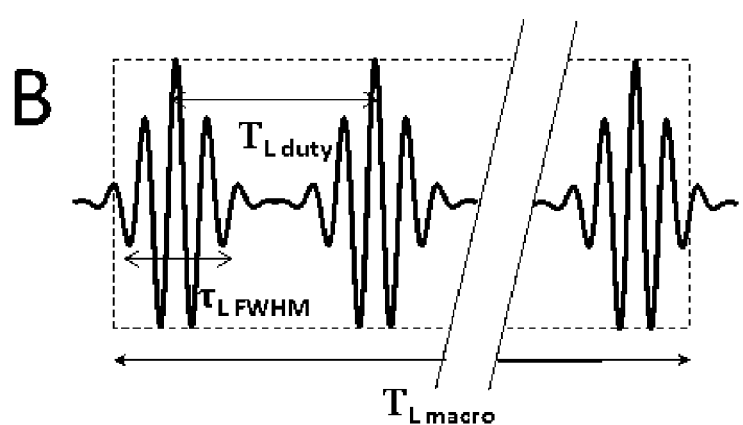
Figure 6C:
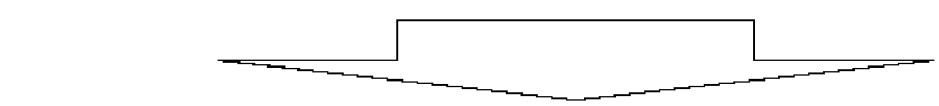
Figure 6D:
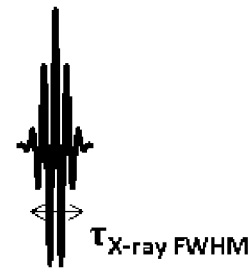

FIGS. 6A-D are diagrams illustrating the structure/shape of the driving laser pulses and the generated HHG pulses FIG. 6A shows a single driving ultrashort pulse input. FIG. 6B indicates that a more complex series of pulses (for example, FEL pulses, consisting of several ultrashort micro pulses within a long (macro) pulse) could also be used. FIG. 6C shows that a series of pulses may be generated by the driving pulse of either 6A or 6B. FIG. 6D shows that a single output pulse may be achieved.

Figure 7A:
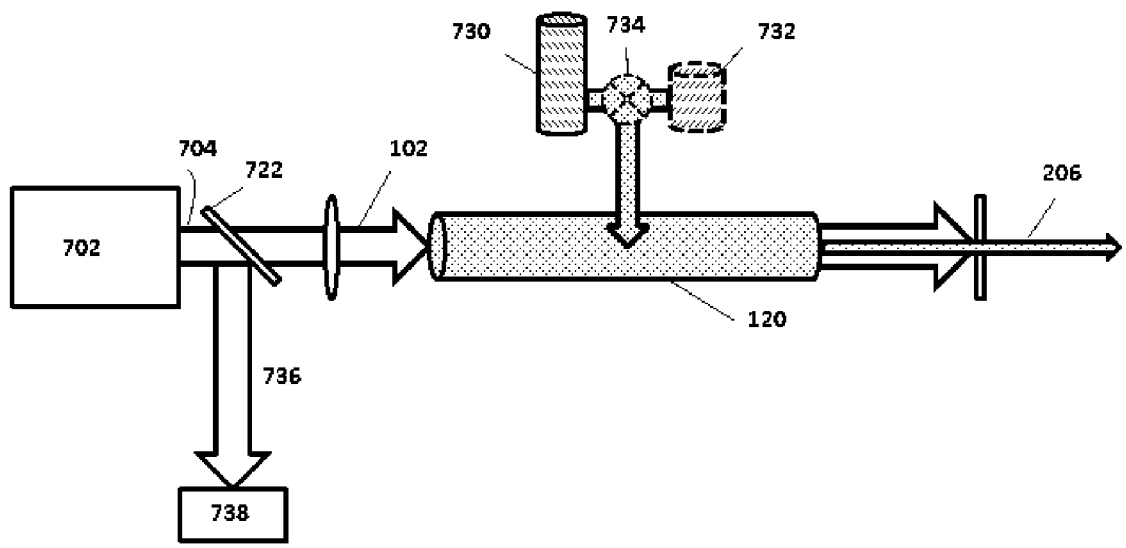
FIG. 7A is a block diagram illustrating a general system for phase-matched HHG of x-rays according to the present invention.

FIG. 7A is a general block diagram illustrating the invention. The embodiment of FIG. 7A might utilize a driving laser source 702 providing, for example, a 1.3 μm pulse or 2.0 μm pulse 102 with a peak intensity of about $10^{14}$ W/cm$^2$-$10^{15}$ W/cm$^2$. For example source 702 might be a laser, a laser in conjunction with an optical parametric amplifier for converting the laser light to the desired driving pulse 704 wavelength, or an optical parametric chirped pulse amplifier, or for example a VIS or IR free electron laser (FEL). The nonlinear medium 120 is moderately ionized, for example from about 10% down to 0.001%. The pressure of the medium can be multi-atmosphere, for example 10,000 torr. The density of the ionized electrons can be about $10^{17}$ cm$^{-3}$. This results in a useful nonlinear medium length $L_{medium}$ of multi-centimeters to a meter or more. The phase-matched addition of the x-ray fields means that flux does not vary strongly with wavelength.

The laser source 702 energy, wavelength, and pulse 704 duration are selected to maintain phase matched HHG 206 generation. Driving source 702 may produce ultrashort driving pulses at any repetition rate or long "macroscopic" pulses at any repetition rate with multiple driving pulses under the envelope.

Medium 730 or 732 might comprise atomic gases (for example, noble gases: helium, neon, argon, etc.), mixtures 730, 734, 732, of molecular gasses, and mixtures of atomic and molecular gases. In mixtures, phase matching relies on the presence of a target that is less or non-ionized compared to the other species targets for a given peak laser intensity. Therefore, a mixture of targets with different ionization potentials is desirable. Mixtures allow the less ionized medium to contribute to the neutral index of refraction. Therefore, higher laser intensity can be employed. As a result higher photon energies may be phase matched with further increase in phase-matched HHG flux. Since the mid-IR driving laser require higher density medium to phase match the HHG process, the nonlinear medium may be liquid, or mixture of liquids, or for example solid state He, Ne, etc.

Figure 7B:
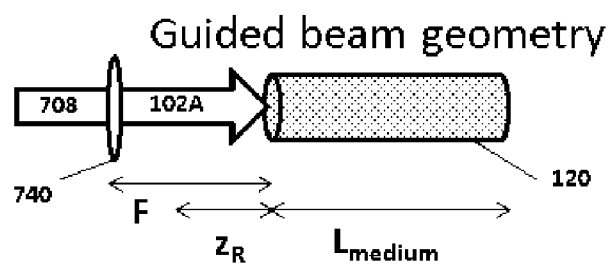
FIG. 7B is a block diagram illustrating a guided beam geometry embodiment of the present invention.

FIG. 7B is a block diagram illustrating a guided beam geometry embodiment of the present invention. A driving laser beam 708 originating from, for example, a wavelength tunable ultrafast laser-optical parametric amplifier system, is focused into a gas-filled 120 hollow waveguide 104 to facilitate near plane-wave propagation. For perfect phase matching of HHG, the driving laser phase velocity must equal that of the generated x-rays. In any HHG geometry, the phase mismatch $\Delta k$ is a sum of contributions from the pressure-dependent neutral atom and free electron dispersion, as well as from pressure-independent geometric dispersion. Phase matching, i.e. $\Delta k \to 0$, can be achieved by varying the gas pressure inside the waveguide since the sign of the neutral atom contribution to the dispersion is opposite that of the generated free-electron plasma. This dispersion balance mechanism has been directly verified through in situ measurements of the coherence length of the HHG process as the phase matching conditions were varied.

The embodiment may require differential pumping to vacuum. Differential pumping to vacuum may be required on both sides of the geometry containing the nonlinear medium. For soft x-ray generation, the geometry containing the nonlinear medium is preceded and followed by a vacuum chamber. When x-rays of shorter wavelengths are generated, a solid window may be used at the entrance and/or exit of this geometry to confine the high density medium, and to obtain vacuum outside of this region.

Phase matching is possible only if the ionization is less than a critical ionization level, $\eta_{CR}(\lambda_L)$. Values for $\eta_{CR}$ are on the order of a few percent in the near-IR region, e.g. approximately 1.5% for Ar, 0.4% for Ne, and 0.2% for He at 1.3 μm driving laser wavelengths. This critical ionization level monotonically decreases as the driving laser wavelength increases from VIS-IR into the mid-IR and higher.

Figure 9:
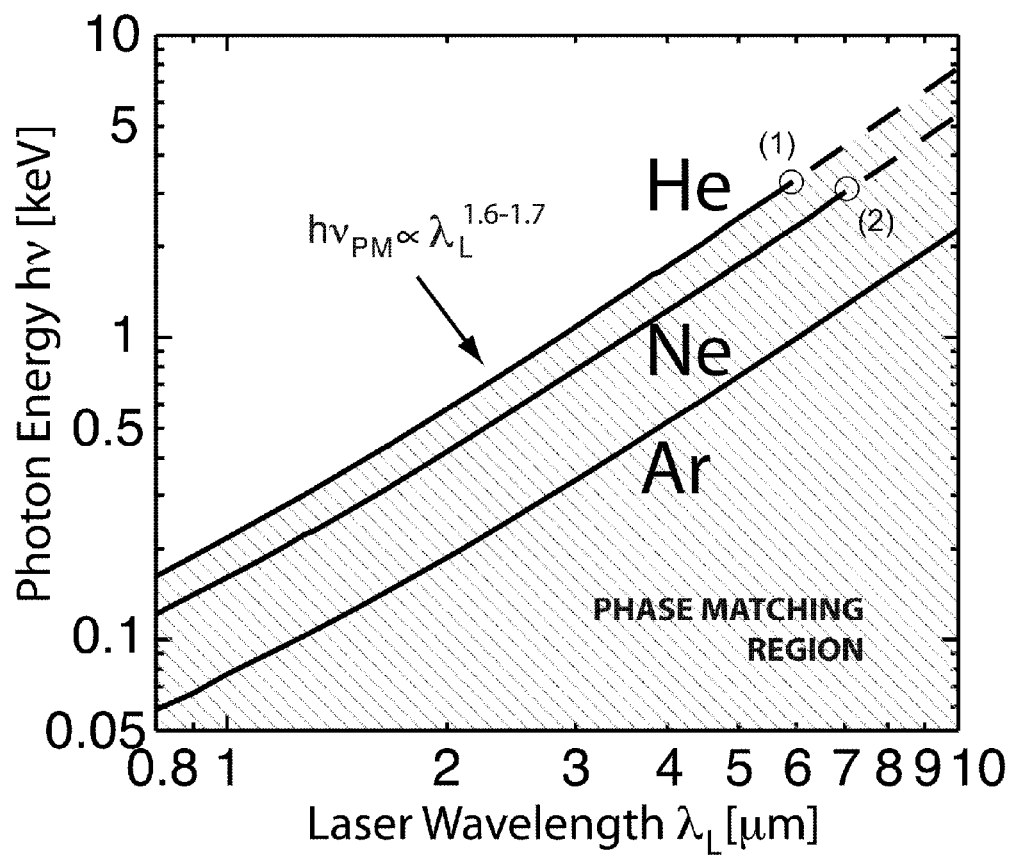
FIG. 9 is a plot of laser energy versus wavelength.

Under the illumination conditions of this embodiment (laser intensities of $10^{14}$-$10^{15}$ W/cm$^2$ and 8-cycle laser pulses), ionization of an atom by an intense laser pulse is well-described by the Ammosov-Delone-Krainov (ADK) tunneling ionization model. Using the ADK model, the laser intensity for which ionization in the medium approaches $\eta_{CR}$. This phase matching cutoff $h\nu_{PM}$ corresponds to the maximum photon energy that can be generated from a macroscopic medium with near-optimum conversion efficiency (full phase matching). FIG. 9 plots the phase matching cutoff $h\nu_{PM}(\lambda_L)$ for values of $\lambda_L$ up to 10 μm, assuming a hyperbolic-secant laser pulse with 8 optical cycles FWHM (35 fs at $\lambda_L$=1.3 μm). This plot shows that phase matching of HHG can extend to 1 keV for driving laser wavelengths approaching 3 μm, and extends even to the multi-keV x-ray region when longer mid-IR laser wavelengths are used. Use of a shorter 3-cycle pulse (FWHM) can increase these phase matching cutoffs by an additional 15%, due to decreased ionization levels for shorter laser pulses. Finally, phase matching cutoffs may increase by an additional few percent due to non-adiabatic effects, which also lower the ionization level and which are not captured by the quasi-static ADK approximation. Using other pulse shapes, for example FEL pulses with rectangular envelopes, may require re-evaluating the optimal pulse intensity based on the accumulated ionization level under such illuminating conditions.

Figure 13A:
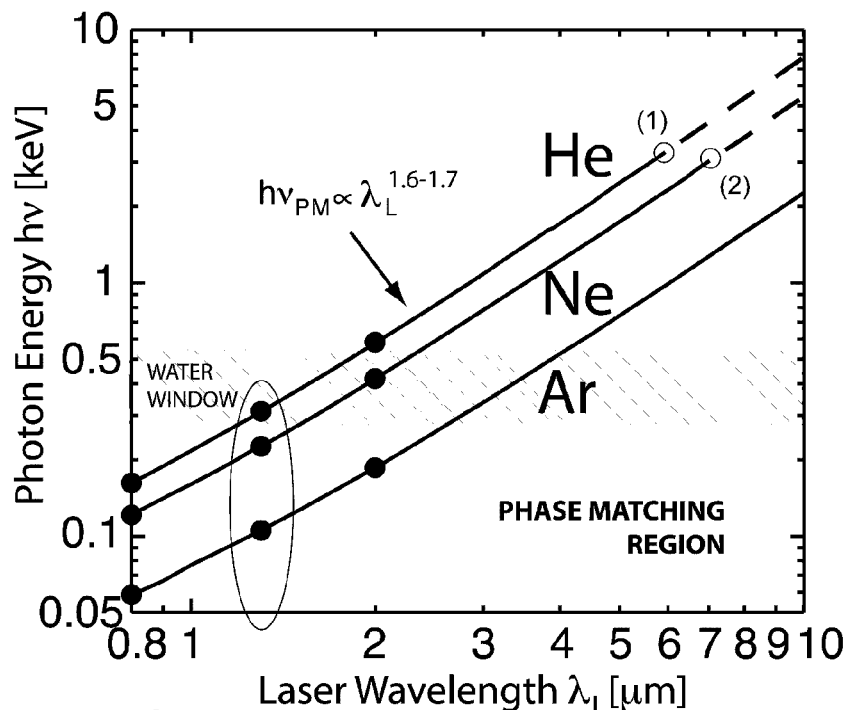
FIGS. 13A and B are plots photon energy versus laser wavelength.
Figure 13B:
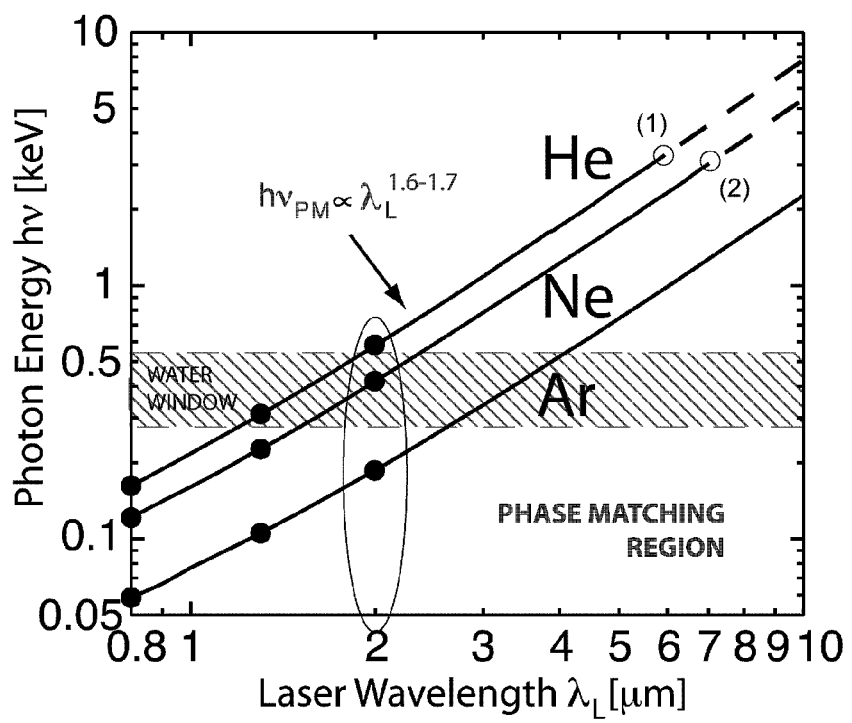

In order to experimentally verify the predicted scaling of the HHG phase matching cutoffs with driving laser wavelength, we generated driving laser beams either from an optical parametric amplifier, tuned to $\lambda_L$=1.3 μm (signal) and $\lambda_L$=2.0 μm (idler), with energy of up to 5.5 mJ and 3.5 mJ, respectively, and with a pulse duration under 35 fs. The driving laser was focused into a hollow capillary filled with Ar, Ne or He gas. Harmonics generated using (prior art) 0.8 μm driving beams serve as a reference. At this reference wavelength, the phase matching cutoff extends in the EUV region of the spectrum to ~50 eV, 90 eV, and 130 eV in Ar, Ne, and He, respectively. Equivalent pressure-tuned phase matching spectra using longer 1.3 μm and 2.0 μm driving lasers resulted in phase matching cutoffs that extend from the EUV into the water window of the soft X-ray region of the spectrum: to ~100 eV and ~165 eV for Ar, and ~200 eV and ~395 eV for Ne, while for He phase matching extends to ~330 eV and ~520 eV for the two laser wavelengths respectively (see FIGS. 13A and 13B respectively). These phase matching cutoff values are all well beyond what can be achieved using a reference 0.8 μm driving laser. As predicted, full phase-matched harmonic emission was achieved at high gas pressures (>>atm) over centimeter distances.

Finally, because of the very large bandwidths that are simultaneously phase matched, these data also show great promise for generating bright, attosecond pulses at much higher photon energies than have been possible to date. A Fourier Transform of the HHG spectra from He in the water window indicates the potential for generating an 11±1 attosecond duration pulse. Past theoretical work has shown that since phase matching is confined to only a few half-cycles of the laser—even when using relatively long driving laser pulses (15 fs at 0.8 μm or 45 fs at 2 μm)—the harmonic emission can emerge as a single attosecond burst. Moreover, this prediction has been confirmed experimentally using 15 fs 0.8 m pulses, where pulses as short as 200 attoseconds were generated even without carrier envelope phase (CEP) stabilization.

Figure 7C:
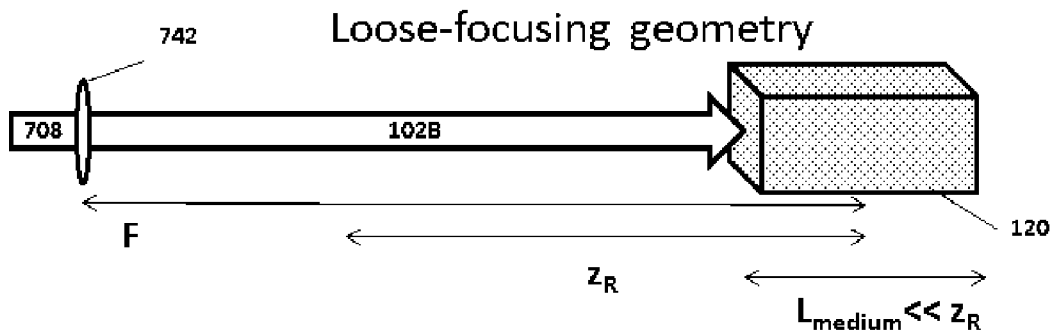
FIG. 7C is a block diagram illustrating a loose-focusing geometry embodiment of the present invention.

FIG. 7C is a block diagram illustrating a loose focusing geometry embodiment of the present invention. The predicted scaling of the critical ionization level and driving laser intensity is also applicable to this HHG scheme. In this embodiment, a near-plane-wave propagation is achieved by using a loosely focused 1026 laser beam 708. A shorter focusing optic 742 is used compared to focusing optic 740. However, a larger laser pulse energy may be required in this case compared to HHG in a wave guide, because the laser beam cross-section increases. For a laser confocal parameter $2z_R$ significantly longer than the interaction region $L_{medium}$, any geometric contribution to the phase mismatch can be neglected. To achieve phase matching, the ionization level must be close to the critical level $\eta_{CR}$. Thus, in contrast with a waveguide geometry embodiment (FIG. 7B), where there is optimal phase-matching pressure, here, density of the medium is decoupled from the phase-matching process (this is also equivalent to a waveguide with a large inner diameter). In both cases (and also for tight focusing embodiment, i.e. using confocal parameter on the scale of $L_{medium}$), the density-length product of the nonlinear medium that optimizes the HHG emission near the phase-matching cutoff is set by the absorption cross-section of the generated X-rays. Therefore, the optimal pressure-length product and phase-matched HHG intensity are the same as the predicted in FIGS. 11A and 6B.

Figure 8:
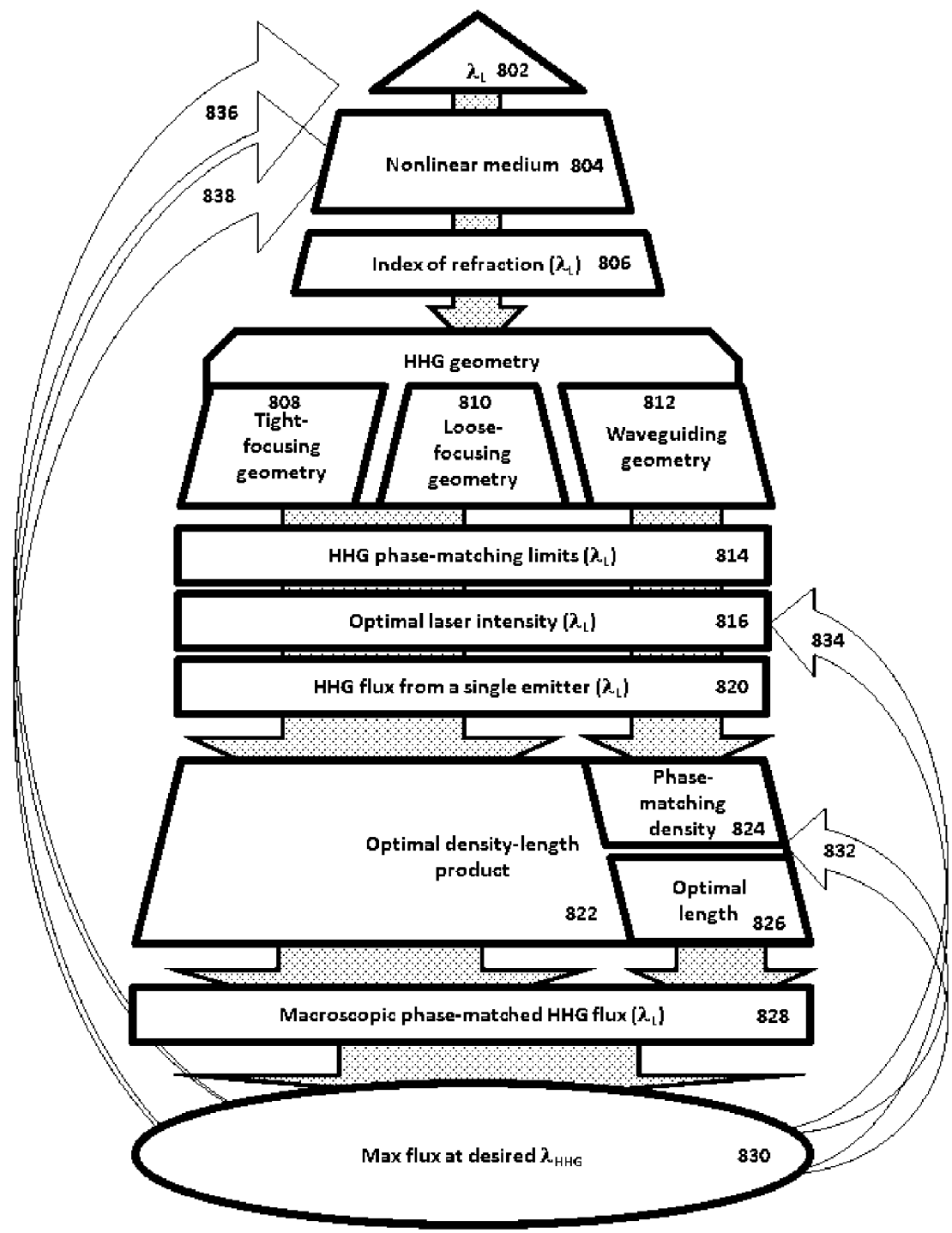
FIG. 8 is a flow diagram illustrating steps in the process of global optimization of HHG with phase matching according to the present invention, and steps in selecting the optimal parameters for most efficient HHG at a desired HHG wavelength.
Figure 10:
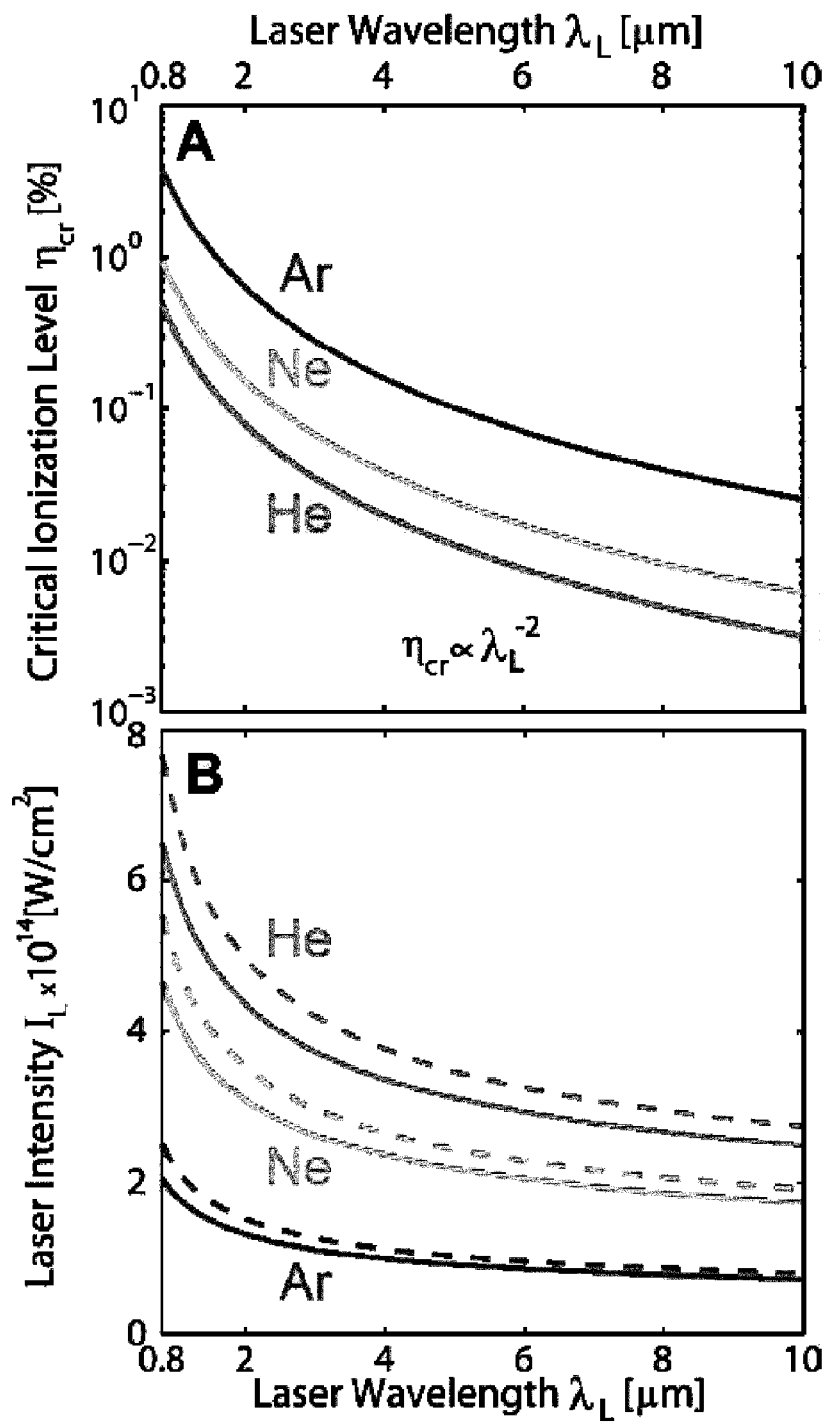
FIG. 10A is a plot of ionization level versus wavelength.
FIG. 10B is a plot of laser intensity versus wavelength.
Figure 12:
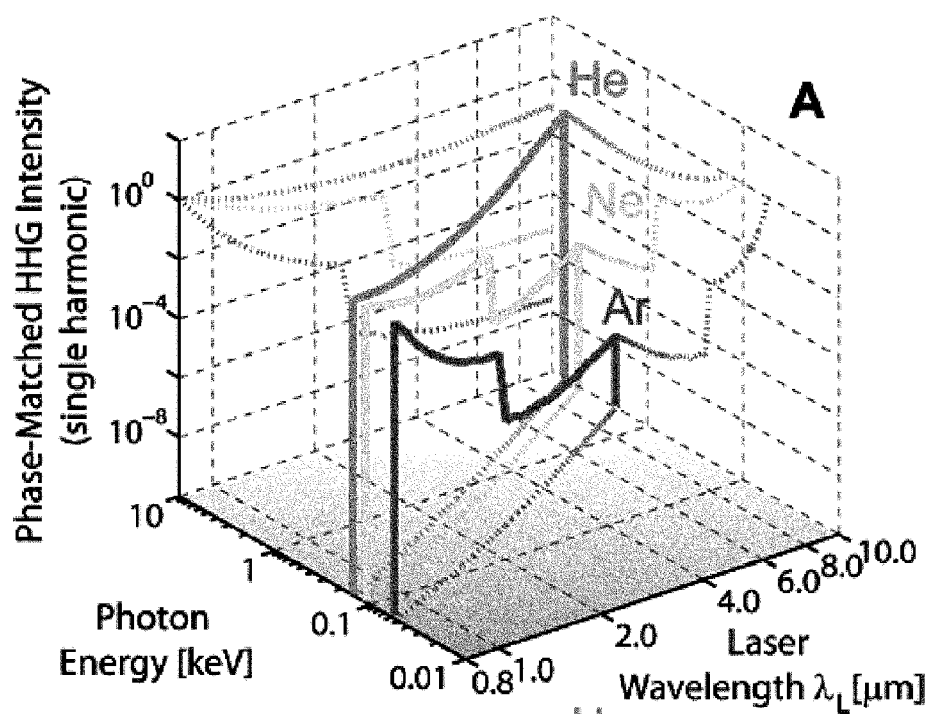
FIG. 12A is a plot of harmonic intensity, energy, and wavelength.
FIG. 12B is a plot of intensity, energy, and wavelength.
Figure 12:
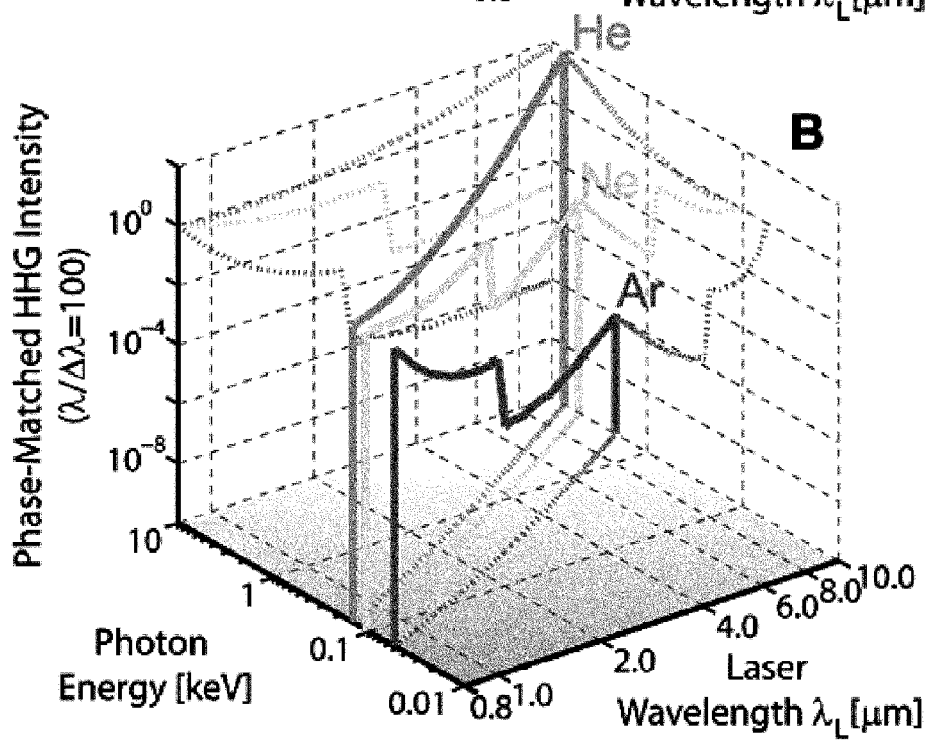

FIG. 8 is a flow diagram illustrating steps in the process of flux optimization of HHG with phase matching according to the present invention. In step 802, $\lambda_L$ of the driving pulse 704 is chosen. In step 804, nonlinear medium 120 is selected. In step 806, the index of refraction of medium 120 for a range of $\lambda_L$ is computed. In steps 808, 810, and 812, the geometry of the device is chosen. In step 814, the phase matching limits as a function of XL are evaluated (see FIGS. 9 and 10A) based on the index of refraction of the driving laser light, and that of the generated light, for a specific nonlinear medium and a specific laser beam geometry. In step 816, the optimal laser pulse 704 parameters are determined (see FIG. 10B). In step 820, the HHG flux from a single emitter as a function of $\lambda_L$ is determined. The generated HHG light in the nonlinear medium 120 can be absorbed by the medium 120. Thus the monotonic growth of the HHG signal may saturate which sets an optimal density-length product 822 (or number of potential emitters) that can be used. The density-length product 822 is determined by the properties of nonlinear medium and in general increases as $\lambda_L$ under the phase matching conditions of the present art (Regime II). See FIGS. 11A and 11B. For geometries where phase matching is pressure dependent (for example, waveguide geometries), first optimal pressure 824 is determined and then optimal length 826, set by the same density-length product 822. Step 828 combines the microscopic, single emitter HHG flux 820, and the optimization of macroscopic nonlinear medium parameters and laser parameters to get the macroscopic phase-matched HHG flux as a function of laser wavelength. Flux 828 can give relative brightness of phase-matched HHG of a desired wavelength for various nonlinear medium, laser wavelengths, etc. FIGS. 12A and 12B illustrate such an optimization for photon energies close to the phase matching limit as a function of laser wavelength 802. Determining the maximum flux 830 at a desired HHG wavelength allows proper selection of optimal laser wavelength 836, optimal nonlinear medium 838, optimal laser pulse parameters 834, optimal density length product 822, or 824 and 826.

While the exemplary preferred embodiments of the present invention are described herein with particularity, those skilled in the art will appreciate various changes, additions, and applications other than those specifically mentioned, which are within the spirit of this invention. For example, the following may further optimize the HHG geometry:

A. A waveguide of optimized length, and diameter, as required for maximum x-ray signal. The laser may be guided in the lowest waveguide mode. Nonlinear medium with density gradient may be used.

B. A tapered waveguide of optimized length, input and output diameter/slab, as required for maximum x-ray signal.

C. A converging laser beam may be used in a loosely focused geometry to compensate for laser energy losses.

D. Shaped driving pulses can be used to mitigate group velocity mismatch between the fundamental and the generated x-ray light. More specifically, a temporal intensity ramp in the envelope of the driving pulse would be useful to keep the high energy part of the driving pulse propagating at the same group velocity as the generated light. This or similar temporal pulse shaping may be also combined with spatial shaping (propagation in a tapered waveguide, converging laser beam, etc.) to mitigate group velocity walk-off.

What is claimed is:

1. A method of generating coherent x-ray emission comprising the steps of:
    (a) providing a gas as a nonlinear medium for high harmonic generation (HHG) of laser light;
    (b) adjusting the pressure of the nonlinear medium to a selected pressure above one atmosphere;
    (c) generating a laser driving pulse in the mid-IR region of the spectrum;
    (d) focusing the driving pulse into the nonlinear medium to cause HHG upconversion into a coherent x-ray generated pulse;
    (e) wherein steps (a) through (d) phase match the driving pulse and the generated pulse sufficiently to result in a coherence length much longer than the absorption depth.

2. The method of claim 1 wherein the laser pulse has a wavelength above 1 μm.

3. The method of claim 2 wherein the laser pulse has a wavelength of about 1.3 μm.

4. The method of claim 2 wherein the laser pulse has a wavelength of about 2 μm.

5. The method of claim 1 wherein the medium has moderate ionization levels between about $10^{-3}$% and 10%.

6. The method of claim 1 wherein the coherence length is at least about 1 mm.

7. The method of claim 6 wherein the coherence length is at least about 1 cm.

8. The method of claim 1 wherein the medium is one of the following: an atomic gas, a molecular gas, a mixture of atomic gases, a mixture of molecular gases, a mixture of atomic and molecular gases.

9. The method of claim 8 wherein the medium is one of the following: He, Ne, or Ar.

10. The method of claim 1 wherein the x-ray generated pulse has a wavelength falling in the soft x-ray region of the spectrum.

11. The method of claim 1 wherein the x-ray generated pulse has a wavelength falling in the water window region of the spectrum.

12. The method of claim 1 wherein the step of adjusting adjusts the pressure to at least multi-atmospheres.

13. The method of claim 1 further including the steps of injecting the medium within a hollow waveguide.

14. The method of claim 1 wherein the step of generating a pulse generates a pulse having a duration of between 3-300 fs and an energy of between 100 µJ and 1 J.

15. The method of claim 1 wherein the step of focusing the driving pulse generates a pulse having one of the following durations: femtosecond, attosecond, zeptosecond.

16. The method of claim 1 wherein the step of generating a pulse generates a pulse having a repetition rate between 1 Hz and 1 MHz.

17. A method for global flux optimization of coherent x-ray emission from a medium at a desired wavelength comprising the steps of:
   (a) evaluating an index of refraction as a function of a range of wavelengths of a driving laser and an index of refraction of the corresponding generated light;
   (b) evaluating HHG phase matching limits as a function of the laser wavelength;
   (c) determining optimal laser parameters as a function of the laser wavelength;
   (d) evaluating flux from a single emitter as a function of driving laser parameters under phase matching conditions;
   (e) evaluating optimal density-length product as a function of the laser wavelength;
   (f) combining steps (a)-(e) for the purpose of calculating macroscopic phase-matched coherent emission as a function of the wavelength of the generated light and the driving laser light;
   (g) finding a global maximum of the flux at the desired HHG wavelength for the purpose of selecting optimal driving laser wavelength, optimal laser pulse parameters, optimal nonlinear medium and parameters of the nonlinear medium.

18. The method of claim 17 where the driving laser wavelength increases to values longer than the wavelength of the generated light for the purpose of optimizing phase matching of HHG at shorter wavelengths.

19. The method of claim 17 where the density-length product of the nonlinear medium increases as the driving laser wavelength increases.

20. The method of claim 17 where the global optimization is performed at the photon energy of the HHG phase matching limits.

21. The method of claim 1 further including the step of injecting the medium within a hollow waveguide.

22. The method of claim 21, wherein the waveguide is tapered.

23. The method of claim 21 further including the steps of differentially pumping the medium from multiple atmospheres to vacuum near each end of the waveguide.

24. The method of claim 1 wherein the step of finding a global maximum of the flux is performed at a laser wavelength at the HHG phase matching limits.

25. The method of claim 1 further including the step of temporally shaping the driving pulse to mitigate group velocity mismatch.

26. The method of claim 1 further including the step of spatially shaping the driving pulse into a converging beam to mitigate group velocity mismatch.

27. The method of claim 1 further including the steps of temporally and spatially shaping the driving pulse to mitigate group velocity mismatch.

* * * * *